(12) United States Patent
Blum et al.

(10) Patent No.: US 9,133,909 B2
(45) Date of Patent: *Sep. 15, 2015

(54) HAND-HELD TOOL DEVICE

(71) Applicant: ROBERT BOSCH GMBH, Stuttgart (DE)

(72) Inventors: Jens Blum, Filderstadt (DE); Tobias Herr, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 141 days.

This patent is subject to a terminal disclaimer.

(21) Appl. No.: 13/726,944

(22) Filed: Dec. 26, 2012

(65) Prior Publication Data

US 2013/0165291 A1 Jun. 27, 2013

(30) Foreign Application Priority Data

Dec. 27, 2011 (DE) .......................... 10 2011 089 917

(51) Int. Cl.
  *F16H 1/28* (2006.01)
  *B25D 16/00* (2006.01)
  *B25D 11/08* (2006.01)
  *B25D 11/02* (2006.01)

(52) U.S. Cl.
  CPC *F16H 1/28* (2013.01); *B25D 11/02* (2013.01); *B25D 11/08* (2013.01); *B25D 16/006* (2013.01); *B25D 2216/0015* (2013.01); *B25D 2216/0023* (2013.01); *B25D 2216/0038* (2013.01)

(58) Field of Classification Search
  USPC .......................... 475/269, 275, 296, 317, 330
  See application file for complete search history.

(56) References Cited

U.S. PATENT DOCUMENTS

| | | | | |
|---|---|---|---|---|
| 6,142,242 A | * | 11/2000 | Okumura et al. | 173/48 |
| 2004/0245005 A1 | * | 12/2004 | Toyama et al. | 173/48 |
| 2008/0167158 A1 | * | 7/2008 | Chen | 475/298 |
| 2008/0308286 A1 | * | 12/2008 | Puzio | 173/210 |
| 2012/0322605 A1 | * | 12/2012 | Hirabayashi | 475/149 |
| 2013/0161042 A1 | * | 6/2013 | Blum et al. | 173/48 |
| 2013/0184116 A1 | * | 7/2013 | Herr | 475/269 |

* cited by examiner

*Primary Examiner* — Justin Holmes
(74) *Attorney, Agent, or Firm* — Kenyon & Kenyon LLP

(57) ABSTRACT

A hand-held tool device includes a planetary transmission and a striking mechanism. The striking mechanism has at least one striking mechanism shut-off clutch and a striking mechanism switching spring which opens the striking mechanism shut-off clutch in at least one operating state. The planetary transmission has at least one planetary transmission stage which at least partially encloses the striking mechanism switching spring in at least one plane.

15 Claims, 11 Drawing Sheets

HAND-HELD TOOL DEVICE

BACKGROUND OF THE INVENTION

Field of the Invention

The present invention relates to a hand-held tool device having a planetary transmission and a striking mechanism, which has at least one striking mechanism shut-off clutch and a striking mechanism switching spring, which opens the striking mechanism shut-off clutch in at least one operating state.

BRIEF SUMMARY OF THE INVENTION

The present invention provides a hand-held tool device having a planetary transmission and a striking mechanism, which has at least one striking mechanism shut-off clutch and a striking mechanism switching spring, which opens the striking mechanism shut-off clutch in at least one operating state. It is provided that the planetary transmission has at least one planetary transmission stage, which partially encloses the striking mechanism switching spring in at least one plane. A "planetary transmission" is particularly a transmission having at least one planetary transmission stage. The planetary transmission preferably has only planetary transmission stages. By "striking mechanism" one should understand especially a device that is provided to generate an impact loading and particularly to output it in the direction of an insertable tool. The striking mechanism preferably conducts the impact loading, at least in a percussion drilling operation, advantageously via the tool spindle of the hand-held tool device and/or particularly via a tool chuck of the hand-held tool device, on to the insertable tool. The striking mechanism is preferably provided to transfer a rotational motion into a particularly translatory striking motion. By "tool spindle" one should particularly understand a shaft which transfers a rotational motion from the planetary transmission to a tool chuck of the hand-held tool device. The tool spindle is preferably developed as a solid shaft. Alternatively, the tool spindle could be developed as a hollow shaft. By "striking mechanism shut-off clutch" one should particularly understand a clutch particularly of a striking mechanism shut-off device which, in at least one operating state, at least prevents and/or advantageously interrupts a drive of the striking mechanism. The striking mechanism shut-off clutch preferably interrupts the drive of the striking mechanism when an operator ends a percussion drilling procedure, that is, in particular, that he removes the rotating insertable tool from a workpiece. By "striking mechanism switching spring" one should particularly understand a spring which, in at least one operating state, applies at least one force on the striking mechanism shut-off clutch, which separates a torsionally fixed connection between two clutch elements of the striking mechanism shut-off clutch. The striking mechanism switching spring is developed as a spring that appears meaningful to one skilled in the art, preferably, however, as a spiral spring. By "planetary transmission stage" one should understand particularly a transmission stage which has at least one planet pinion, that is connected to a planet carrier, the former being coupled to an internal geared wheel in the outward radial direction and to a sun wheel in the inward radial direction. The planetary transmission preferably has a first, a second, a third and a fourth planetary transmission stage. The second, the third and the fourth planetary transmission stage advantageously enclose the striking mechanism switching spring at least partially in at least one plane. By the expression "essentially enclose in at least one plane" one should particularly understand that rays originating from a point of the striking mechanism switching spring, which are situated in the plane perpendicular to the rotational axis of the planetary transmission stage, intersect the planetary transmission stage over an angular range of at least 180 degrees, advantageously of at least 270 degrees. Particularly advantageously, the planetary transmission stage encloses the striking mechanism switching spring in at least one plane about 360 degrees. A direction of contraction of the striking mechanism switching spring is preferably aligned parallel to an axial direction of the planetary transmission stage. The striking mechanism switching spring advantageously encloses the rotational axis of the planetary transmission stage in at least one plane. A sun wheel of the planetary transmission stage preferably encloses the striking mechanism switching spring in at least one plane. By the design, according to the present invention, of the hand-held tool device, a particularly small, light and yet efficient striking mechanism is able to be provided, in which the insertable tool is actuated in a striking manner automatically only during a percussion drilling operation.

In a further refinement, it is provided that the particularly second and advantageously third planetary transmission stage be situated functionally between at least two additional planetary transmission stages, whereby, in a constructively simple manner, a particularly space-saving striking mechanism shut-off clutch is made possible. By the expression "situated between at least two additional planetary transmission stages" one should understand that a first component element of the planetary transmission stage is connected torsionally fixed to a component of an additional planetary transmission stage and a second component of the planetary transmission stage is connected torsionally fixed to a component of the other, additional planetary transmission stage of the planetary transmission.

Furthermore, it is provided that the particularly second and advantageously the third planetary transmission stage support the striking mechanism switching spring, whereby a large clutching force, which is required to close the striking mechanism shut-off clutch, is able to be attained in a constructively simple manner. By "supporting" it should particularly be understood that a part of the striking mechanism switching spring is situated immovably with respect to the planetary transmission stage, and, in at least one operating state, a force acts upon the planetary transmission stage.

Moreover, it is provided that the particularly second and advantageously the third planetary transmission stage has a planet carrier which supports the striking mechanism switching spring, whereby an advantageous assembly is made possible in a constructively simple manner. By "planet carrier" one should particularly understand a component of a planetary transmission stage, that guides a planet pinion rotatably on a circular path.

In addition, it is provided that the hand-held tool device have a tool spindle, which, in at least one operating state is connected torsionally fixed to at least one part of the particularly second planetary transmission stage, whereby at least one advantageous transmission ratio of the planetary transmission is able to be achieved. By "tool spindle" one should particularly understand a shaft which transfers a rotational motion from the planetary transmission to a tool chuck of the hand-held tool device. The tool spindle is preferably developed as a solid shaft. Alternatively, the tool spindle could be developed as a hollow shaft. By "connected torsionally fixed" one should understand particularly that the tool spindle and the part of the planet transmission stage are coupled relative to each other immovably about a rotational axis. The tool spindle and the part of the planetary transmission stage are advantageously connected with form-locking.

It is furthermore provided that the hand-held tool device include a drive device, which is connected torsionally fixed to at least one part of the particularly fourth planetary transmission stage, especially to a sun wheel of the planetary transmission stage, whereby a small clutching force, which is required for closing the striking mechanism shut-off clutch, is able to be attained in a constructively simple manner. By "drive unit" one should particularly understand a unit which, during an operation, provides mechanical energy for driving the planetary transmission. The drive unit is developed as a unit that appears meaningful to one skilled in the art, advantageously, however, as an electric motor.

In one advantageous development of the present invention, it is provided that the drive unit supports the striking mechanism switching spring, especially on the side facing away from the tool chuck, whereby a particularly simple construction is possible.

In one additional embodiment it is provided that the planetary transmission has at least two, advantageously three planetary transmission stages, which enclose the striking mechanism switching spring at least partially in at least one plane, whereby small spring constants of the striking mechanism switching spring are able to be implemented in a simple manner. The second, the third and particularly the fourth planetary transmission stage preferably enclose the striking mechanism switching spring at least partially in at least one plane.

Furthermore, it is provided that the hand-held tool device has a tool spindle, which, in at least one operating state, transfers an axial clutching force in the direction of the striking mechanism switching spring which, in one operating state opens the striking mechanism shut-off clutch, whereby a constructively simple design may be attained. By the expression "transmit an axial clutching force" one should particularly understand that the tool spindle transfers a force, in at least one operating state, which opens the striking mechanism shut-off clutch and/or advantageously closes it. The tool spindle is preferably supported axially displaceable for the transfer of the clutching motion.

In addition, the present invention is based on a hand-held tool having a hand-held tool device according to the present invention. The hand-held tool is preferably provided to actuate the insertable tool in a screw mode, in a drilling mode, in a screw drilling mode and particularly in a chisel mode.

DETAILED DESCRIPTION OF THE INVENTION

Figure 1:
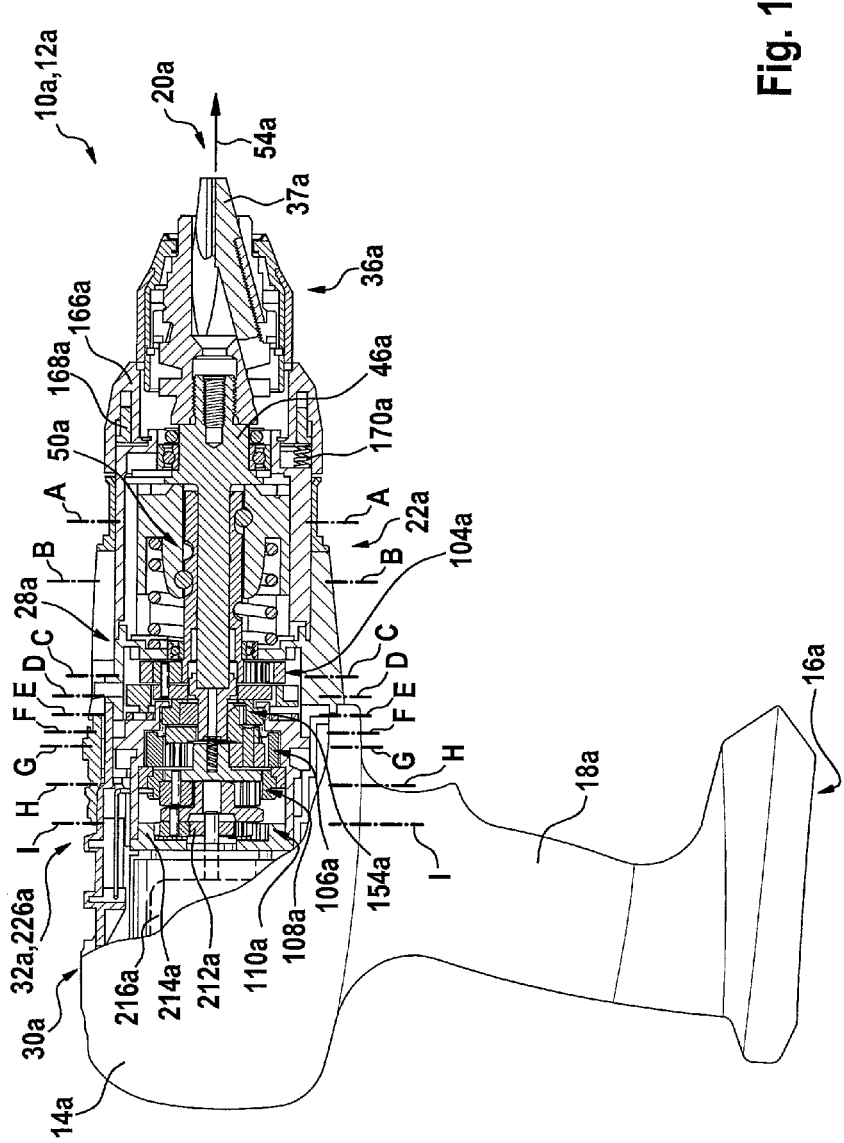
FIG. 1 shows a section of a hand-held tool having a hand-held tool device according to the present invention.

FIG. 1 shows a hand-held tool 10a. Hand-held tool 10a is developed as a percussion drilling screw machine. Hand-held tool 10a has a hand-held tool device 12a according to the present invention, and hand-held tool housing 14a and a battery interface 16a. Battery interface 16a is provided to supply hand-held tool device 12a with electric power from a hand-held tool battery not shown here in greater detail. Hand-held tool housing 14a is developed in the shape of a pistol. Hand-held tool housing 14a is developed to have many parts. It includes a hand grip 18a, by which an operator holds hand-held tool 10a during a working process. Hand-held tool device 12a includes a tool guide unit 20a, a striking mechanism 22a, a first striking mechanism shut-off device 24a, a second striking mechanism shut-off device 26a, a planetary transmission 28a, a drive unit 30a, an operating device 32a and a torque limitation unit 34a.

Tool guide unit 20a includes a tool chuck 36a and a tool spindle 38a. During a working process, tool chuck 36a fastens an insertable tool not shown here, such as a drill or a screw bit. Tool chuck 36a fastens the insertable tool in a force-locking manner. Tool chuck 36a has three clamping jaws that an operator is able to fasten movably, which fasten the insertable tool during a working process. In addition, tool chuck 36a fastens the insertable tool during a working process in a manner that is axially immovable with respect to tool chuck 36a and particularly with respect to tool spindle 38a. One part of tool chuck 36a and tool spindle 38a are connected to each other relatively immovably. In this case, tool chuck 36a and tool spindle 38a are screwed together. Hand-held tool device 12a has a bearing means 40a, which supports tool spindle 38a on a side facing tool chuck 36a. Bearing means 40a supports tool spindle 38a in an axially displaceable manner. Bearing means 40a is connected axially fixed to tool spindle 38a. Bearing means 40a is supported axially movable to hand-held tool housing 14a. Hand-held tool device 12a has an additional bearing means 41a, which supports tool spindle 38a on a side facing planetary transmission 28a. Bearing means 41a is developed as a roller bearing, in this case as a needle bearing, whereby a support having little play is made possible. Bearing means 41a supports tool spindle 38a in an axially displaceable manner. A striking mechanism spindle 46a encloses bearing means 41a. Bearing means 41a is functionally situated between tool spindle 38a and striking mechanism spindle 46a.

Tool spindle 38a includes a striking surface 42a, which a beater 44a of the striking mechanism 22a beats during a percussion drilling operation. Beater 44a has a mass that is maximally two-thirds the size of the mass of tool guide unit 20a. In this case, the mass of beater 44a is less than one-half as great as the mass of tool guide unit 20a. The mass of beater 44a amounts to about 45% of the mass of tool guide unit 20a.

Figure 2:
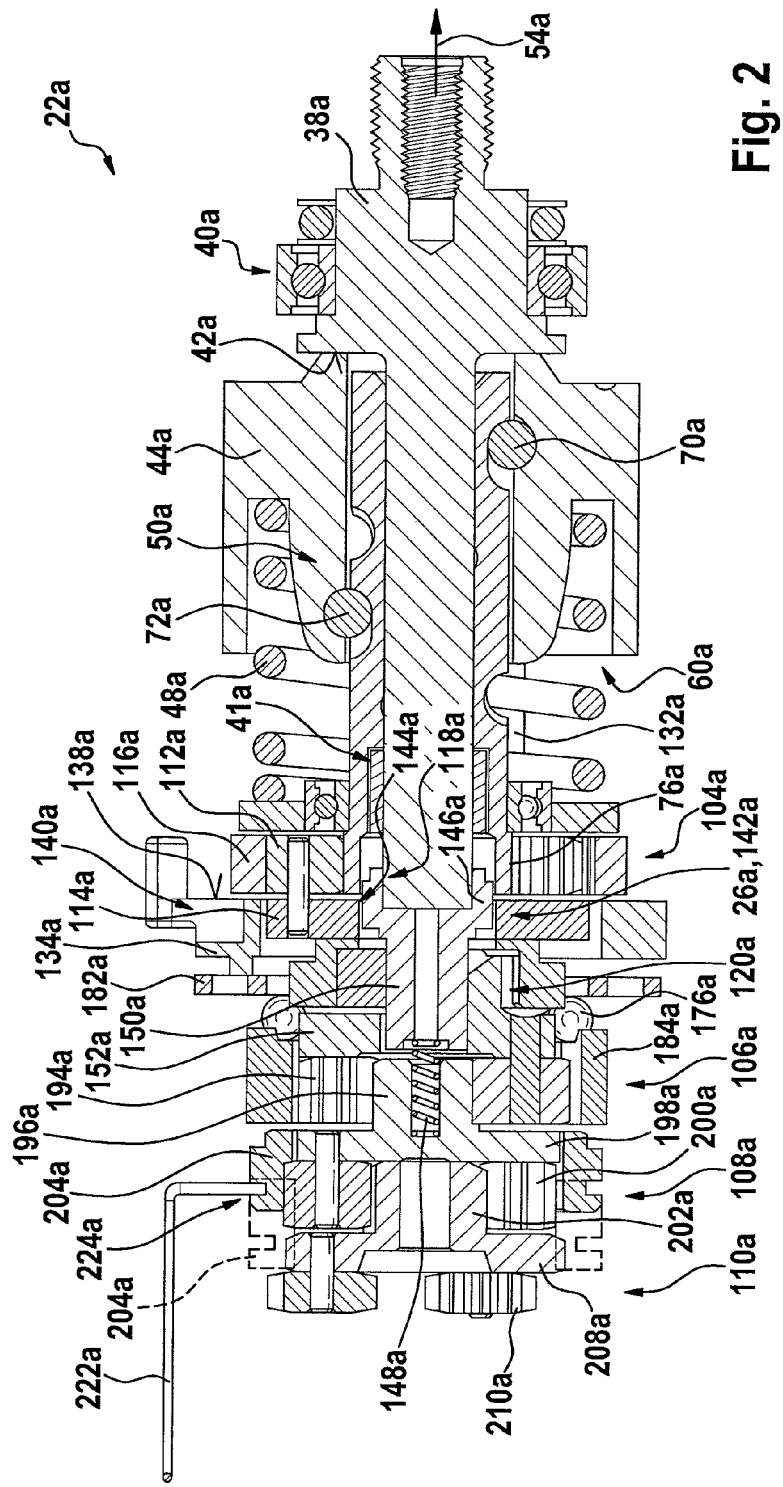
FIG. 2 shows a partially left open section through a striking mechanism and a planetary transmission of the hand-held tool device of FIG. 1.

In FIG. 2, striking mechanism 22a and planetary transmission 28a are shown in greater detail. Striking mechanism 22a has beater 44a, striking mechanism spindle 46a, a striking mechanism spring 48a, a striking mechanism driving device 50a and a beater guide 52a. Beater 44a is supported translatorially movable in striking direction 54a. Striking direction 54a is aligned parallel to an axial direction of striking mechanism spindle 46a.

Figure 3:
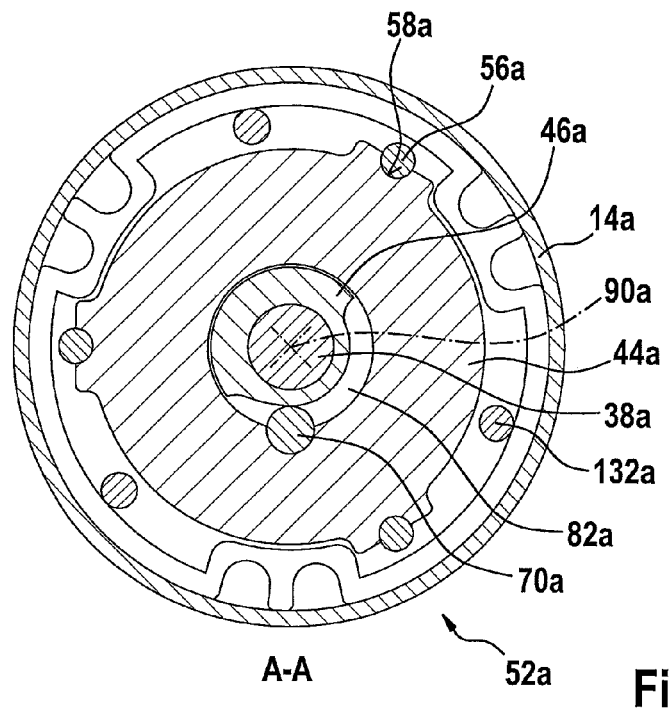
FIG. 3 shows a first sectional area A of the striking mechanism of the hand-held tool device of FIG. 1.
Figure 4:
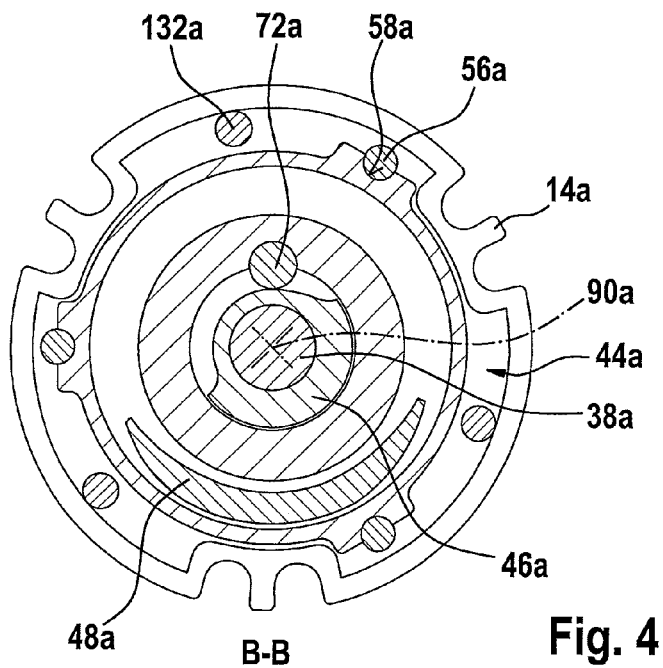
FIG. 4 shows a second sectional area B of the striking mechanism of the hand-held tool device of FIG. 1.

FIGS. 3 and 4 show a sectional area A and a sectional area B of striking mechanism 22a. Beater guide 52a supports beater 44a torsionally fixed with respect to hand-held tool housing 14a. Beater guide 52a has three guide rods 56a on which beater 44a slides. Guide rods 56a are situated regularly around beater 44a. Beater 44a has sliding surfaces 58a, which enclose guide rods 56a in a plane perpendicular to striking direction 54a over 180 degrees. Beater 44a encloses striking mechanism spindle 46a in a plane aligned perpendicular to striking direction 54a, over 360 degrees. In addition, beater 44a encloses tool spindle 38a on the plane over 360 degrees. Moreover, striking mechanism spindle 46a encloses on the plane tool spindle 38a over 360 degrees. Striking mechanism spindle 46a is situated coaxially with tool spindle 38a.

Figure 5:
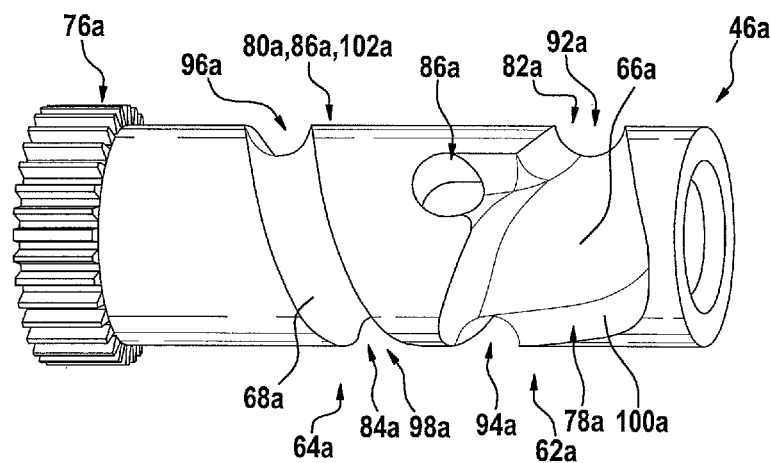
FIG. 5 shows a perspective representation of a striking mechanism spindle of the striking mechanism of the hand-held tool device of FIG. 1.
Figure 6:
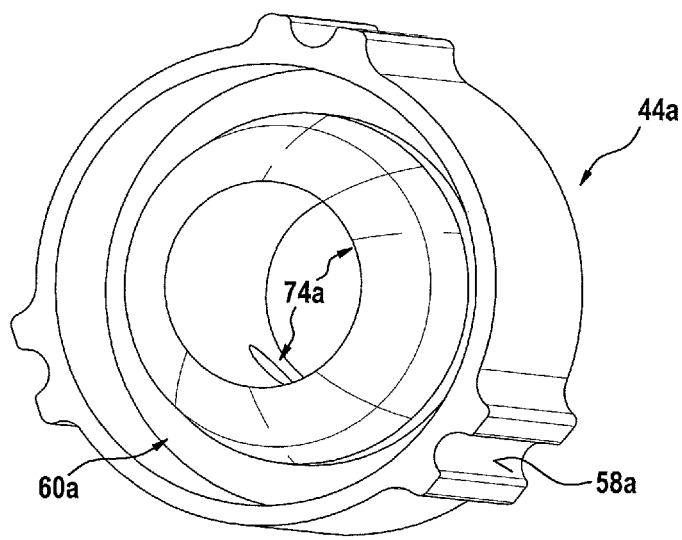
FIG. 6 shows a perspective representation of a beater of the striking mechanism of the hand-held tool device of FIG. 1.

Striking mechanism spring 48a accelerates beater 44a before a strike in striking direction 54a. For this purpose, hand-held tool housing 14a supports striking mechanism spring 48a on a side facing away from beater 44a. Striking mechanism spring 48a presses directly against beater 44a. Beater 44a has a spring fastening 60a. Spring fastening 60a is developed as an annular depression. FIG. 5 shows striking mechanism spindle 46a in a perspective view. FIG. 6 shows beater 44a in a perspective view. Beater driving device 50a has a first curve guide 62a and a second first curve guide 64a. Curve guides 62a, 64a each include a guiding curve 66a, 68a and connecting means 70a, 72a. Connecting means 70a, 72a are developed to be ball-shaped. Beater 44a supports connecting means 70a, 72a in place with respect to beater 44a. Beater 44a has hemisphere-shaped fastening recesses 74a. Connecting means 70a, 72a slide in guiding curves 66a, 68a during a percussion drilling operation. Striking mechanism spindle 46a has a part of curve guides 62a, 64a, namely, guiding curve 66a, 68a. Striking mechanism spindle 46a borders a space in which connecting means 70a, 72a move during a percussion drilling operation.

Striking mechanism spindle 46a is developed as a hollow shaft. Planetary transmission 28a drives striking mechanism spindle 46a. For this purpose, striking mechanism spindle 46a has a toothing 76a on the side facing away from tool chuck 36a. Guiding curves 66a, 68a each have an impact-free region 78a, 80a, an impact wind-up region 82a, 84a and an assembly recess 86a, 88a. During assembly, connecting means 70a, 72a are inserted through assembly recesses 86a, 88a into fastening recesses 74a of beater 44a. In a percussion drilling operation, striking mechanism spindle 46a rotates clockwise as seen in striking direction 54a. Impact wind-up regions 82a, 84a are developed to be spiral-shaped. They extend over 180 degrees about a rotational axis 90a of striking mechanism spindle 46a. Impact wind-up regions 82a, 84a move connecting means 70a, 72a, and with that, beater 44a counter to striking direction 54a in the percussion drilling operation. Consequently, striking mechanism 22a has connecting means 70a, 72a which, in at least one operating state, transfer a motion from striking mechanism spindle 46a to beater 44a.

Impact-free regions 78a, 80a each connect two ends 92a, 94a, 96a, 98a of impact wind-up regions 82a, 84a. Impact-free regions 78a, 80a extend over 180 degrees about a rotational axis 90a of striking mechanism spindle 46a. Impact-free regions 78a, 80a each have an impact side 100a, 102a which, starting from an end 94a, 96a of impact wind-up region 82a, facing planetary transmission 28a, runs approximately parallel to striking direction 54a. After the connecting means 70a, 72a penetrate impact-free regions 78a, 80a, striking mechanism spring 48a accelerates beater 44a and connecting means 70a, 72a in striking direction 54a. In this context, connecting means 70a, 72a move through impact free-wheeling regions 78a, 80a, without experiencing an axial force, until beater 44a hits striking surface 42a. Curve guides 62a, 64a are situated about rotational axis 90a, offset by 180 degrees. Curve guides 62a, 64a are situated one behind the other in the axial direction.

Figure 7:
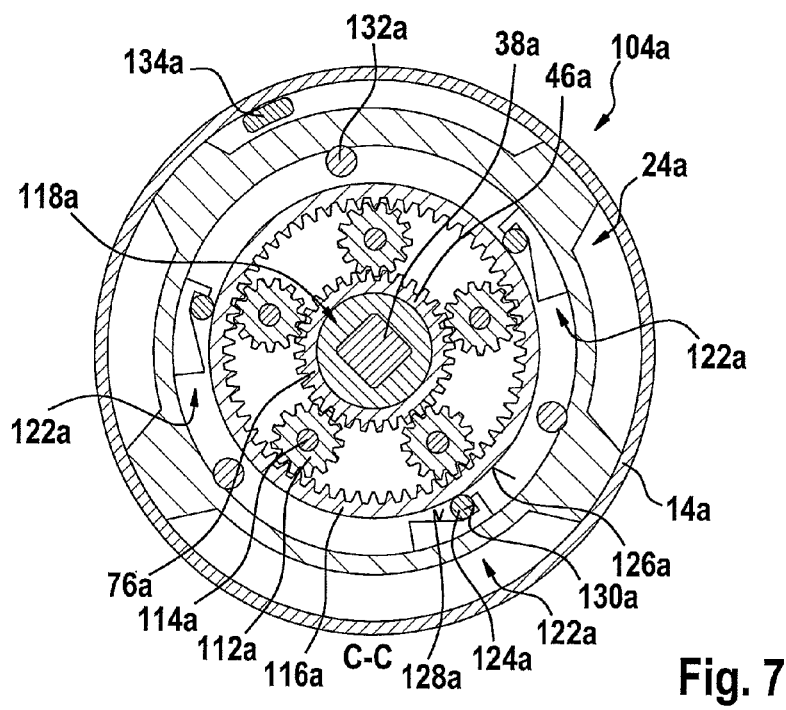
FIG. 7 shows a sectional area C of a first planetary transmission stage and of a first striking mechanism shut-off device of the hand-held tool device of FIG. 1.

Planetary transmission 28a has first planetary transmission stage 104a, a second planetary transmission stage 106a, a third planetary transmission stage 108a and a fourth planetary transmission stage 110a FIG. 7 shows a sectional area C of first planetary transmission stage 104a. Planetary transmission stages 104a, 106a, 108a, 110a shown in FIGS. 7, 12, 13 and 15 have toothed wheels having a number of teeth that appears meaningful to one skilled in the art. The toothed wheels of planetary transmission stages 104a, 106a, 108a, 110a engage with one another, which, in this case, is partially not shown like that. First planetary transmission stage 104a increases a first rotational speed of second planetary transmission stage 106a for driving striking mechanism 22a. Second planetary transmission stage 106a drives tool spindle 38a at this first rotational speed. Toothing 76a of striking mechanism spindle 46a forms a sunwheel of first planetary transmission stage 104a. Toothing 76a meshes with planet pinions 112a of first planetary transmission stage 104a, which are guided by a planet carrier 114a of first planetary transmission stage 104a. An internal geared wheel 116a of first planetary transmission stage 104a meshes with planet pinions 112a of first planetary transmission stage 104a.

During a percussion drilling operation, first striking mechanism shut-off device 24a fixes internal geared wheel 116a of first planetary transmission stage 104a immovable with respect to hand-held tool housing 14a. First striking mechanism shut-off device 24a is provided to switch on beater driving device 50a in response to a first right-hand drilling rotation direction, and to switch off automatically beater driving device 50a in response to a second, left-hand drilling rotation direction. First striking mechanism shut-off device 24a acts on internal geared wheel 116a of first planetary transmission stage 104a. First striking mechanism shut-off device 24a blocks internal geared wheel 116a of first planetary transmission stage 104a at the first right-hand drilling rotation direction. First striking mechanism shut-off device 24a releases internal geared wheel 116a of first planetary transmission stage 104a in response to second, left-hand drilling rotation direction, so that it is able to rotate. For this purpose, striking mechanism shut-off device 24a has three clamping mechanisms 122a. Clamping mechanisms 122a each include a blocking means 124a, a first clamping surface 126a, a second clamping surface 128a and free-wheeling surfaces 130a. Sealing means 124a is developed as a roller. First clamping surface 126a forms an area, lying outside, of a surface of internal geared wheel 116a of first planetary transmission stage 104 a. Second clamping surface 128a is situated immovable with respect to hand-held tool housing 14a. During an operation in the first, right-hand drilling rotation direction, blocking means 124a clamp between first clamping surfaces 126a and second clamping surface 128a. During an operation in the second, left-hand drilling rotation direction, free-wheeling areas 130a guide blocking means 124a and prevent clamping.

Furthermore, FIG. 7 shows connecting means 118a, which connects tool spindle 38a and a planet carrier 120a of the second planetary transmission stage 106a in a torsionally fixed manner. Connecting means 118a connects tool spindle 38a and planet carrier 120a of second planetary transmission stage 106a in an axially displaceable manner, in this case.

Figure 8:
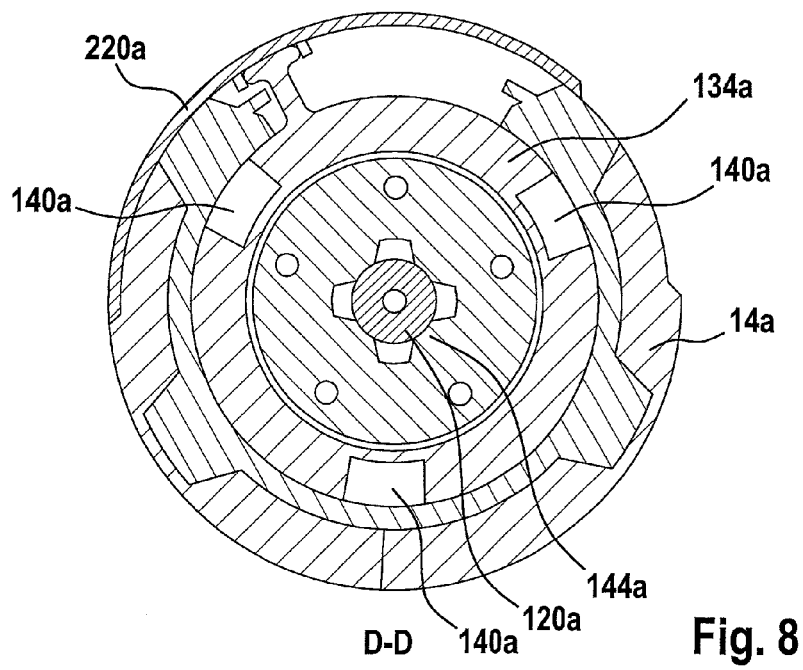
FIG. 8 shows a sectional area D of a control element and a second striking mechanism shut-off device of the hand-held tool device of FIG. 1.
Figure 9:
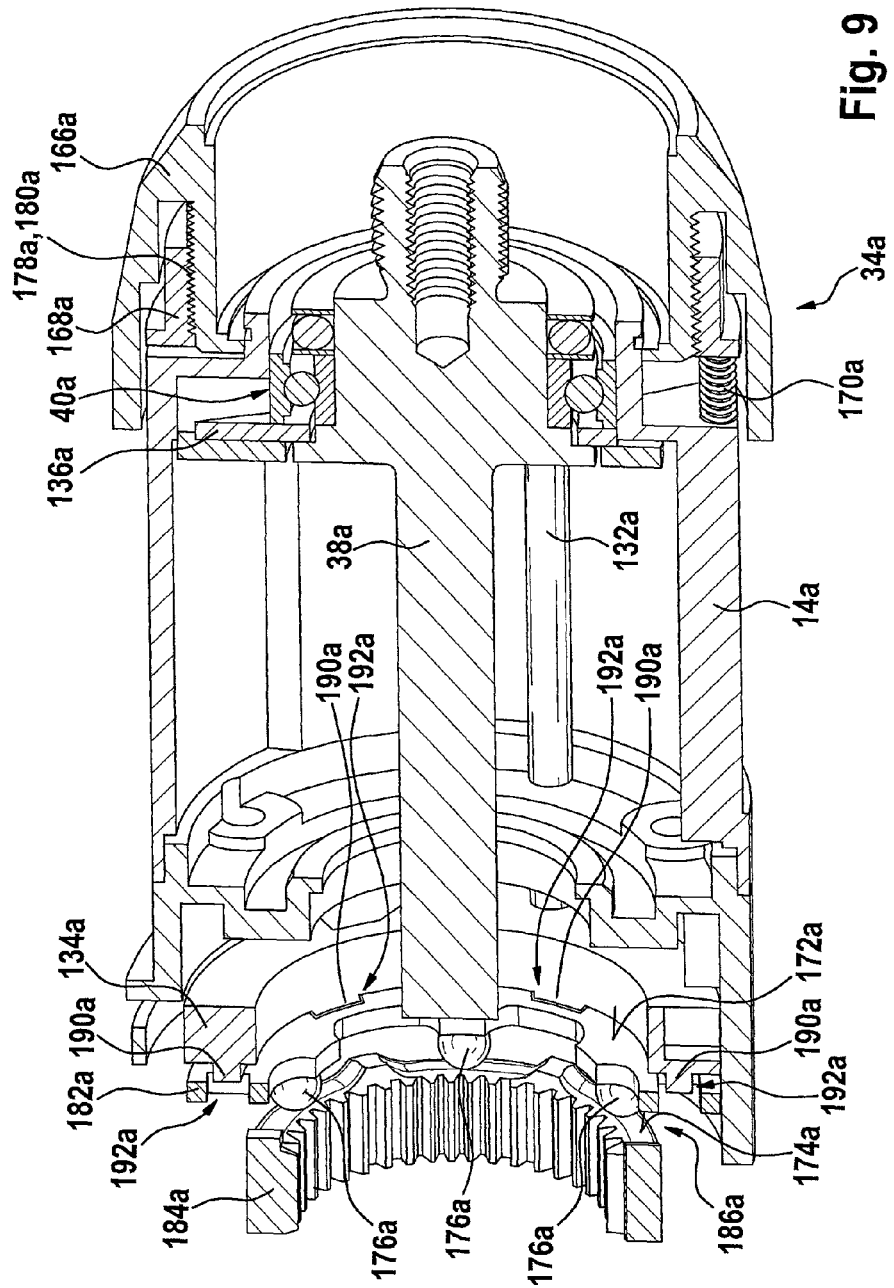
FIG. 9 shows a perspective sectional representation of a part of the hand-held tool device of FIG. 1.

Moreover, FIGS. 3, 4 and 7 show three first transfer means 132a of second striking mechanism shut-off device 26a. Transfer means 132a are implemented as rods. FIG. 8 shows a sectional area D through a control element 134a of handheld tool device 12a. FIG. 9 shows second striking mechanism shut-off device 26a in a perspective sectional representation. Control element 134a supports tool guide unit 20a in a screw mode shown in FIGS. 1, 8 and 9 and in a drilling mode in a direction counter to striking direction 54a. A force applied to tool guide unit 20a acts via bearing means 40a, a second transfer means 136a of second striking mechanism shut-off device 26a and first transfer means 132a on support areas 138a of control element 134a. Control element 134a has three recesses 140a. In a percussion drilling operation shown in FIG. 2, first transfer means 132a are able to be inserted into recesses 140a, whereby tool guide unit 20a is axially movable.

Second striking mechanism shut-off device 26a has a striking mechanism shut-off clutch 142a. Striking mechanism shut-off clutch 142a is partially developed as one piece with planetary transmission 28a. Striking mechanism shut-off clutch 142a is situated between first planetary transmission stage 104a and second planetary transmission stage 106a. Striking mechanism shut-off clutch 142a has a first clutch 144a which is connected torsionally fixed to a planet carrier 114a of first planetary transmission stage 104a. Striking mechanism shut-off clutch 142a has a second clutch element 146a which is connected torsionally fixed to a planet carrier 120a of first planetary transmission stage 106a. In the screw mode and the drilling mode shown, striking mechanism shut-off clutch 142a is opened. In a percussion drilling operation, tool spindle 38a transfers an axial clutching force to striking mechanism shut-off clutch 142a when the operator presses an insertable tool against a workpiece. The clutching force closes striking mechanism shut-off clutch 142a. In FIG. 2, striking mechanism shut-off clutch 142a is shown closed. When the operator of the insertable tool removes it from the workpiece, a striking mechanism switching spring 148a of hand-held tool device 12a opens striking mechanism shut-off clutch 142a.

Planet carrier 120a of second planetary transmission stage 106a is developed as two parts. A first part 150a of planet carrier 120a of second planetary transmission stage 106a is connected torsionally fixed to tool spindle 38a. First part 150a of planet carrier 120a is connected to tool spindle 38a in an axially displaceable manner, whereby planet carrier 120a remains torsionally coupled to tool spindle 38a even during a striking maneuver. Thus, first part 150a is permanently connected to tool spindle 38a. First part 150a of planet carrier 120a is supported dispaceably against striking mechanism switching spring 148a. A second part 152a of planet carrier 120a of second planetary transmission stage 106a is connected torsionally fixed to first part 150a of planet carrier 120a. First part 150a and second part 152a of planet carrier 120a are connected to each other in an axially displaceable manner. First part 150a and second part 152a of planet carrier 120a are connected permanently in a torsionally fixed manner.

Figure 10:
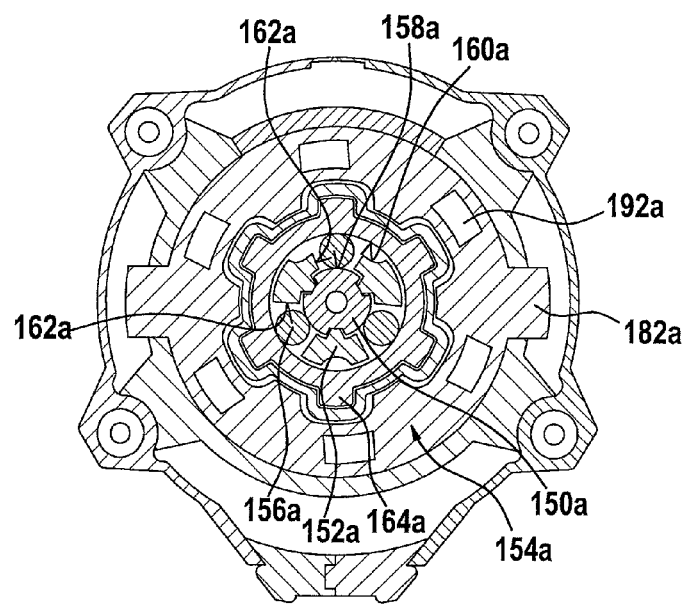
FIG. 10 shows a sectional area E of a spindle blocking device of the hand-held tool device of FIG. 1.

FIG. 10 shows a sectional area of a spindle blocking device 154a of hand-held tool device 12a. Spindle blocking device 154a is provided to connect tool spindle 38a to hand-held tool housing 14a in a torsionally fixed manner, when a tool torque is applied to tool chuck 36a, for instance, during the clamping of an insertable tool into tool chuck 36a. Spindle blocking device 154a is partially developed as one piece with planet carrier 120a of second planetary transmission stage 106a. Spindle blocking device 154a has blocking means 156a, first clamping surfaces 158a, a second clamping surface 160a and free-wheeling surfaces 162a. Blocking means 156a are developed in a roller-shaped manner. First clamping surfaces 158a are developed as areas of a surface of first part 150a of planet carrier 120a of second planetary transmission stage 106a. First clamping surfaces 158a are developed to be flat. Second clamping surface 164a is developed as the inner side of a clamping ring 164a of spindle blocking device 154a. Clamping ring 164a is connected torsionally fixed to handheld tool housing 14a. Free-wheeling surfaces 162a are developed as areas of a surface of first part 152a of planet carrier 120a of second planetary transmission stage 106a. When a tool torque is applied to tool chuck 36a, blocking means 156a clamp between first clamping surfaces 158a and second clamping surface 160a. When drive unit 30a is driving, free-wheeling surfaces 162a guide blocking means 156a on a circular path and prevent clamping. First part 150a and second part 152a of planet carrier 120a are geared to each other, having play.

FIGS. 1, 2, 9 and 10 shows torque limitation unit 34a. Torque limitation unit 34a is provided to limit the tool torque that is maximally output by tool chuck 36a in a screw mode.

Figure 11:
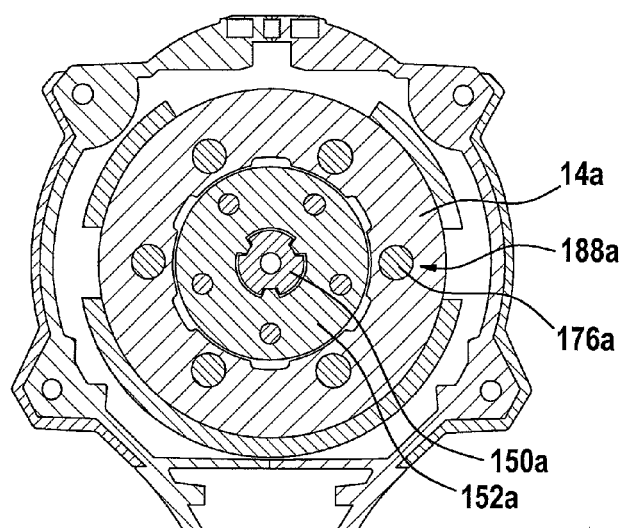
FIG. 11 shows a sectional area F through blocking means of a spindle blocking device of the hand-held tool device of FIG. 1.

Torque limitation unit 34a includes an operating unit 166a, an adjusting element 168a, limitation strings 170a, transfer means not shown in greater detail, first impact surfaces 172a, a second impact surface 174a and limitation means 176a. Operating element 166a is developed to be ring-shaped. It follows tool chuck 36a, in the direction of planetary transmission 28a. Operating element 166a has a setting screw thread 178a, which is matched to a setting screw thread 180a of adjusting element 168a. Adjusting element 168a is supported torsionally fixed and axially displaceable. A rotation of operating element 166a displaces adjusting element 168a in the axial direction. Limiting springs 170a are supported on one side on adjusting element 168a. Limiting springs 170a are supported on another side via the transfer means to impact means 182a of torque limitation unit 34a. A surface of impact means 182a has first impact surface 172a. In screw mode, impact means 182a is displaceably supported in the axial direction by limiting springs 170a. Second impact surface 174a is developed as an area of the surface of an internal geared wheel 184a of second planetary transmission stage 106a. Second striking surface 174a has trough-shaped depressions 186a. Limiting means 176a are developed in a ball-shaped manner. Limiting means 176a are supported displaceably in tube-shaped recesses 188a in impact direction 54a. FIG. 11 shows a sectional area F of torque limitation unit 34a. During a screw process, limitation means 176a are situated in the trough-shaped recessions 186a. Limitation means 176a fasten internal geared wheel 184a of second planetary transmission stage 106a. When the maximum tool torque, that is set, has been reached, limitation means 176a press away impact means 182a against limiting springs 170a. Then, limitation means 176a each jump in the next one of the trough-shaped depressions 186a. In the process, internal geared wheel 194a of second planetary transmission stage 106a is turning, whereby the screw process is interrupted.

Control element 134a of hand-held tool device 12a has supporting means 190a, which, at least during a drilling operation, prevent an axial motion of impact means 182a. For this purpose, supporting means 190a support impact means 182a in the axial direction. Impact means 182a has screw recesses 192a, into which impact means 182a dip in response to reaching the maximum tool torque, particularly in a screw operation as shown in FIG. 9. Supporting means 190a are situated accordingly during a screw setting of control element 134a. In the case of a percussion drilling operation, support means 190a also prevent an axial motion of impact means 182a and, with that, a response of torque limitation unit 34a. As an alternative, impact means could also be situated, during a percussion drilling operation, so that they are able to dip into screw recesses. Thus, a torque limitation unit would be active in the percussion drilling operation.

Figure 12:
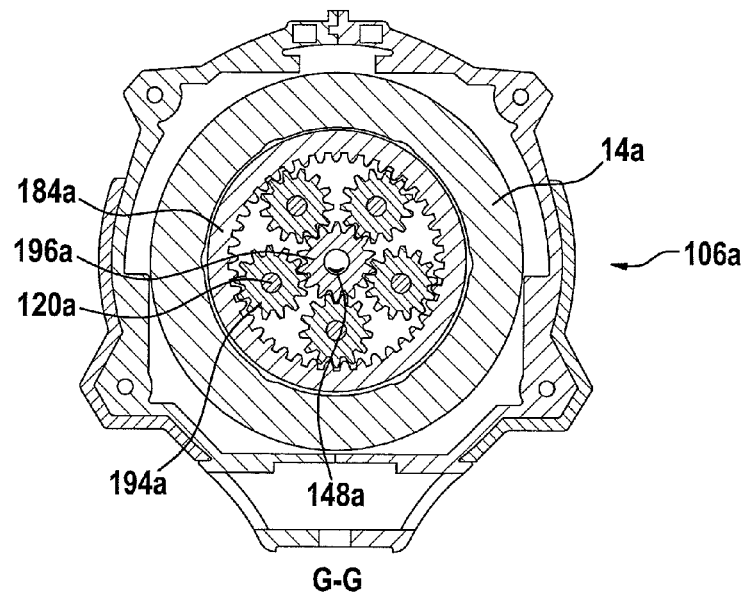
FIG. 12 shows a sectional area G of a second planetary transmission stage of the hand-held tool device of FIG. 1.

FIG. 12 shows a sectional area G of second planetary transmission stage 106a. At least during a drilling operation, internal geared wheel 184a of second planetary transmission stage 106a is supported, protected from a complete revolution, in hand-held tool housing 14a. Planet pinions 194a of second planetary transmission stage 106a mesh with internal geared wheel 184a and a sun wheel 196a of second planetary transmission stage 106a.

Figure 13:
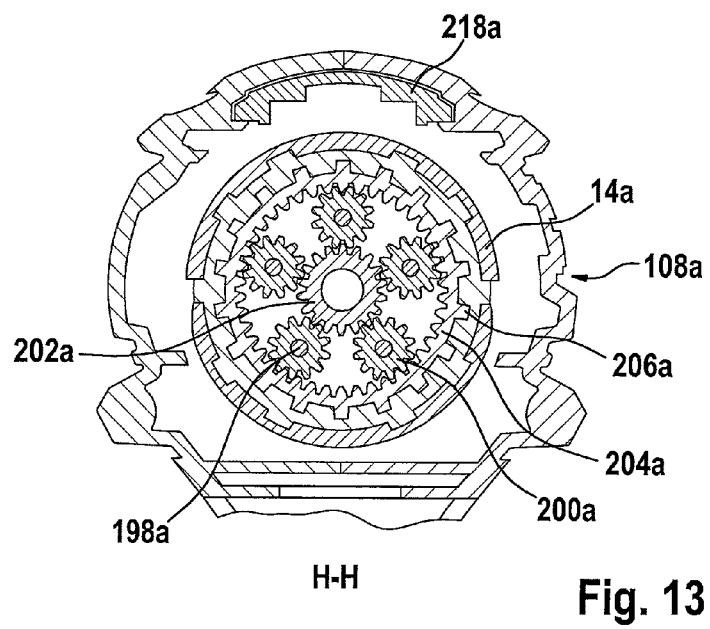
FIG. 13 shows a sectional area H of a third planetary transmission stage of the hand-held tool device of FIG. 1.

FIG. 13 shows a sectional area H of third planetary transmission stage 108a. Sun wheel 196a of second planetary transmission stage 106a is connected torsionally fixed to a planet carrier 198a of third planetary transmission stage 108a. Planet pinions 200a of third planetary transmission stage 108a mesh with a sun wheel 202a and an internal geared wheel 204a of third planetary transmission stage 108a. Internal geared wheel 204a of third planetary transmission stage 108a has a gearing 206a which connects internal geared wheel 204a of third planetary transmission stage 108a torsionally fixed to hand-held tool housing 14a, in a first transmission ratio.

Figure 14:
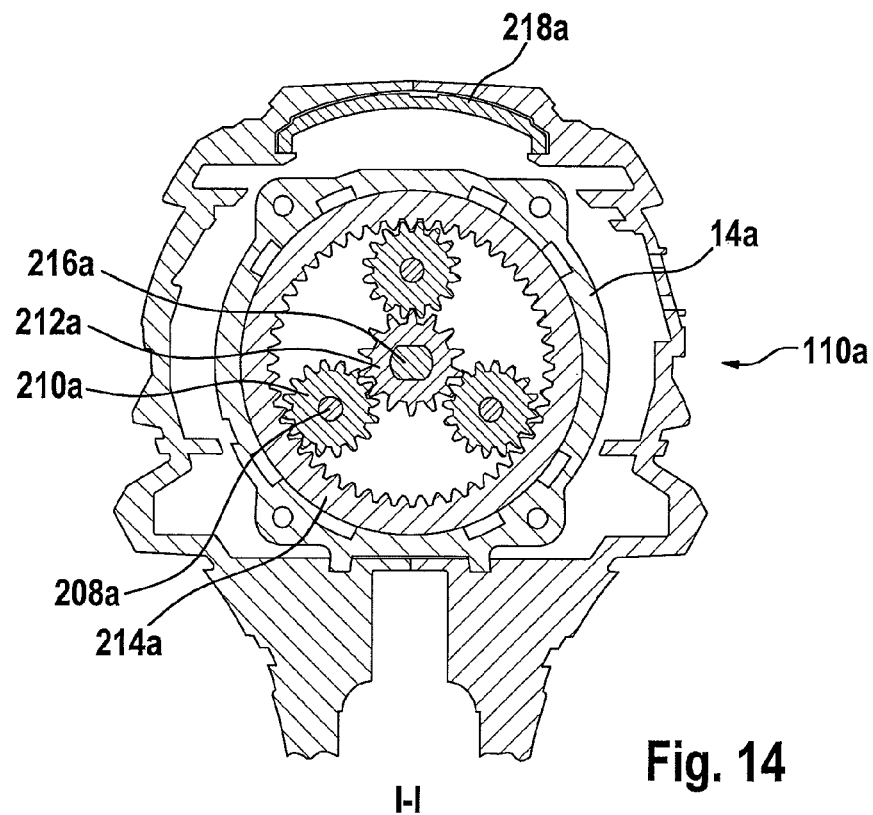
FIG. 14 shows a sectional area I of a fourth planetary transmission stage of the hand-held tool device of FIG. 1.

FIG. 14 shows a sectional area I of third planetary transmission stage 108a. Sun wheel 202a of third planetary transmission stage 108a is connected torsionally fixed to a planet carrier 208a of fourth planetary transmission stage 110a. Planet pinions 210a of fourth planetary transmission stage 110a mesh with a sun wheel 212a and an internal geared wheel 214a of fourth planetary transmission stage 110a. Internal geared wheel 214a is connected torsionally fixed to hand-held tool housing 14a. Sun wheel 212a of fourth planetary transmission stage 110a is connected torsionally fixed to a rotor 216a of drive unit 30a.

Internal geared wheel 204a of third planetary transmission stage 108a is supported displaceably in the axial direction, as shown in FIG. 2. In the first transmission ratio, internal geared wheel 204a of third planetary transmission stage 108a is connected torsionally fixed to hand-held tool housing 14a. In the second transmission, internal geared wheel 204a of third planetary transmission stage 108a is connected displaceably to planet carrier 208a of fourth planetary transmission stage 110a, and supported rotatably with respect to hand-held tool housing 14a. Consequently, there comes about a step-down ratio of the first transmission between rotor 216a of drive unit 30a and planet carrier 198a of third planetary transmission stage 108a which is greater than a step-down ratio of the second transmission.

Operating device 32a has a first operating element 218a and a second operating element 220a. First operating element 218a is situated on the side of hand-held tool housing 14a that faces away from handle 18a. It is supported movably parallel to the axial direction of planetary transmission 28a. First operating element 218a is connected via adjusting means 222a of operating device 32a to internal geared wheel 204a of third planetary transmission stage 108a in the axial direction. Internal geared wheel 204a of third planetary transmission stage 108a has a groove 224a in which adjusting means 222a engages. Thus, internal geared wheel 204a of third planetary transmission stage 108a is connected to adjusting means 222a in the axial direction, axially rotatable with respect to adjusting means 222a. Adjusting means 222a is developed to be springy, whereby the transmission from a rotary position of internal geared wheel 204a of third planetary transmission stage 108a is able to be adjusted independently. When first operating element 218a is pushed in the direction of tool chuck 36a, this sets the first transmission. When second operating element 220a is pushed away from tool chuck 36a, this sets the second transmission.

Second operating element 220a is situated on the side of hand-held tool housing 14a that faces away from handle 18a. Second operating element 220a is situated displaceable about an axis which is aligned parallel to the axial direction of planetary transmission 28a. Second operating element 220a is connected torsionally fixed to control element 134a of hand-held tool device 12a. Using second operating element 220a, one is able to set the screw mode, the drilling mode and the percussion drilling mode. When second operating element 220a is pushed to the left, as seen in striking direction 54a, this sets the percussion drilling mode. When second operating element 220a is pushed to the right, as seen in striking direction 54a, this sets the screw mode. When second operating element 220a is pushed to the middle, as seen in striking direction 54a, this sets the drilling mode.

Figure 15:
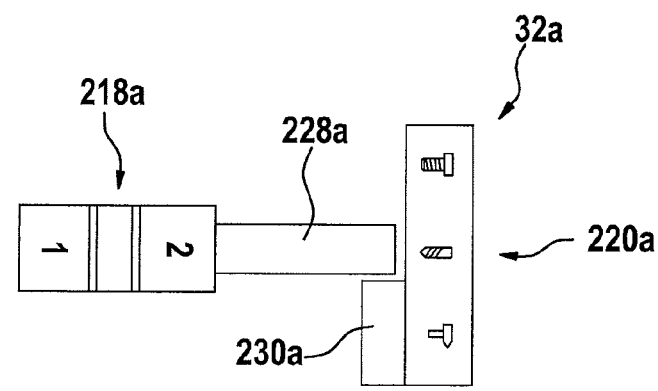
FIG. 15 shows a schematic representation of an operating device and a protective device of the hand-held tool device of FIG. 1.

FIG. 15 schematically shows a protective device 226a of hand-held tool device 12a, which prevents an operation in the first transmission in the percussion drilling operation. In FIG. 15, the first transmission and the drilling mode are set. Protective device 226a is partially developed as one piece with operating device 32a. First operating element 218a has first blocking means 228a of protective device 226a connected to it in an attached form. Second operating element 220a has second blocking means 230a of protective device 226a connected to it in an attached form. Blocking means 228a are each developed tongue-shaped. First blocking means 228a extends in the direction of second operating element 220a. Second blocking means 230a extends in the direction of first operating element 218a. Protective device 226a prevents switching over into the percussion drilling operation when the first transmission is set. Protective device 226a prevents switching over into the first transmission when the percussion drilling operation is set.

Drive unit 30a is developed as an electric motor. Drive unit 30a has a maximum torque which causes a maximum tool torque in the first transmission of more than 15 Nm, and in the second transmission of less than 15 Nm. The maximum tool torque in the first transmission amounts to 30 Nm. The maximum tool torque in the second transmission amounts to 10 Nm. In this context, the tool torque should be determined according to Standard DIN EN 60745.

Striking mechanism switching spring 148a of hand-held tool device 12a, in the case of a percussion drilling operation, opens striking mechanism shut-off clutch 142a when the operator removes the insertable tool from the workpiece. Striking mechanism switching spring 148a is situated coaxially to planetary transmission stages 104a, 106a, 108a, 110a of planetary transmission 28a. Second planetary transmission stage 106a and third planetary transmission stage 108a enclose striking mechanism switching spring 148a in each case in at least one plane, which is aligned perpendicular to the axial direction of planetary transmission 28a. Second planetary transmission stage 106a and third planetary transmission stage 108a are each situated functionally between at least two additional planetary transmission stages 104a, 106a, 108a, 110a of planetary transmission 28a. Planet carrier 120a of second planetary transmission stage 106a supports striking mechanism switching spring 148a on the side facing away from tool chuck 36a.

FIGS. 16 through 19 show additional exemplary embodiments of the present invention. The following descriptions and the drawings are limited essentially to the differences between the exemplary embodiments. Regarding components that are designated in the same way, particularly regarding components having identical reference numerals, it is fundamentally possible to refer also to the drawings and/or the description of the other exemplary embodiments, especially of FIGS. 1 through 15. In order to distinguish the exemplary embodiments, the letter a is added after the reference numerals of the exemplary embodiment in FIGS. 1 through 15. In the exemplary embodiments of FIGS. 16 through 19, the letter a is replaced by the letter b or by the letters b through e.

Figure 16:
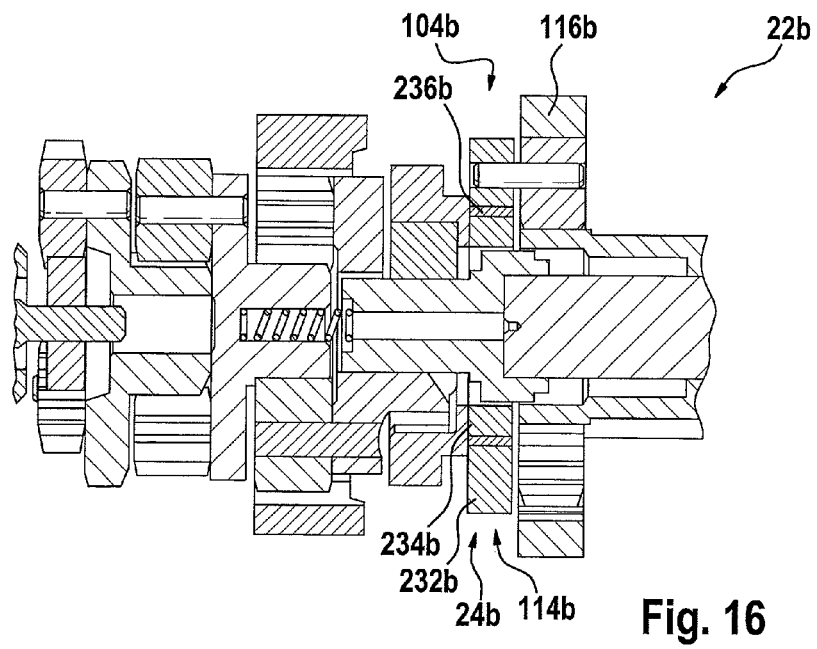
FIG. 16 shows an alternative exemplary embodiment of a first striking mechanism shut-off device of a hand-held tool device according to the present invention.

FIG. 16 shows schematically an additional, alternative exemplary embodiment of a first striking mechanism shut-off device 24b. A planet carrier 114b of a first planetary transmission stage 104b is developed in two parts. A first part 232b of the planet carrier 114b guides planet pinions 112b of first planetary transmission stage stage 104b. A second part 234b of planet carrier 114b is torsionally coupled to a second planetary transmission stage 106b. A first striking mechanism shut-off device 24b of a striking mechanism 22b has a freewheel 236b that appears meaningful to one skilled in the art, which connects first part 232b and second part 234b of planet carrier 114b in response to a right hand drilling rotation direction and separates them in response to a left handed drilling rotation direction. An internal geared wheel 116b of first planetary transmission stage 104b is permanently connected to a hand-held tool housing, torsionally fixed.

Figure 17:
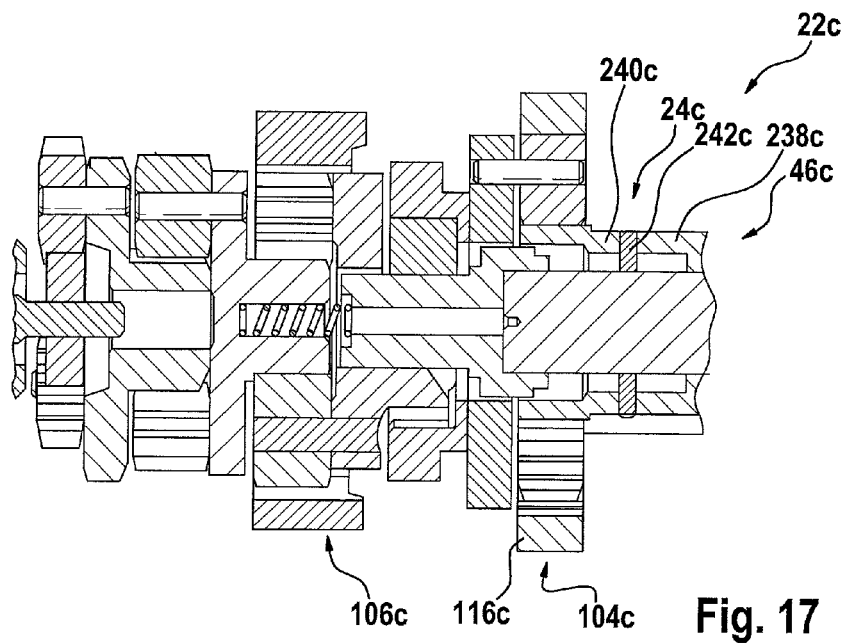
FIG. 17 shows an additional exemplary embodiment of a first striking mechanism shut-off device of a hand-held tool device according to the present invention.

FIG. 17 shows schematically a next exemplary embodiment of a first striking mechanism shut-off device 24c. A striking mechanism spindle 46c of a striking mechanism 22c is developed in two parts. A first part 238c of striking mechanism spindle 46c is connected to a striking mechanism drive device. A second part 240c of striking mechanism spindle 46c is connected to a second planetary transmission stage 106c. First striking mechanism shut-off device 24c has a freewheel 242c that appears meaningful to one skilled in the art, which connects first part 238c and second part 240c of striking mechanism spindle 46c torsionally fixed, in response to a right hand drilling rotation direction and separates them in response to a left handed drilling rotation direction. An internal geared wheel 116c of first planetary transmission stage 104c is permanently connected, torsionally fixed, to a hand-held tool housing.

Figure 18:
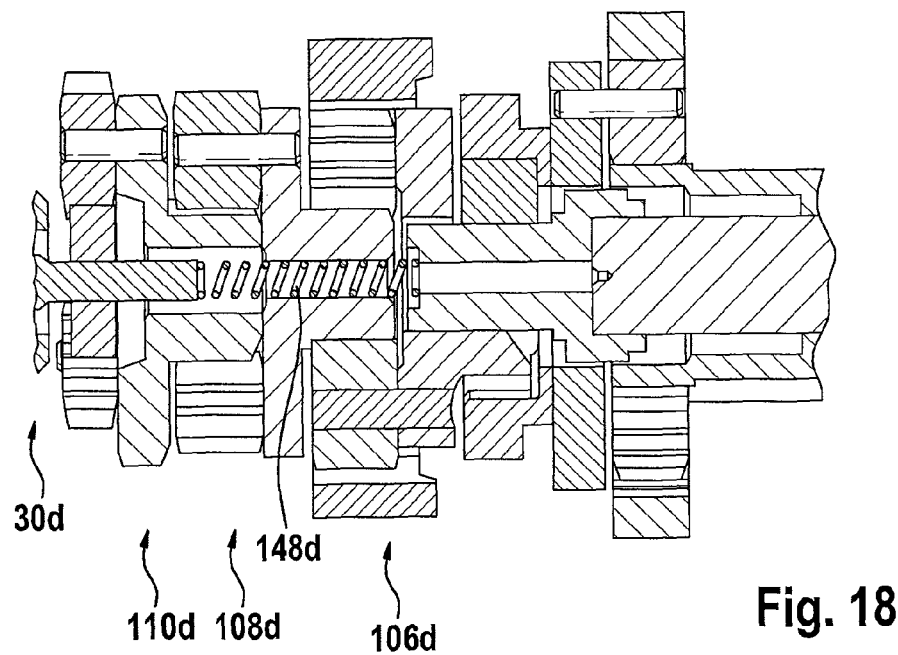
FIG. 18 shows an alternative exemplary embodiment of a striking mechanism switch spring of a hand-held tool device according to the present invention.

FIG. 18 shows a further exemplary embodiment of a striking mechanism switching spring 148d. A second planetary transmission stage 106d supports striking mechanism switching spring 148d on the side facing the tool chuck. A drive unit 30d supports striking mechanism switching spring 148d on the side facing away from the tool chuck. Second planetary transmission stage 106d, a third planetary transmission stage 108d and a fourth planetary transmission stage 110d enclose the striking mechanism switching spring 148d in each case in at least one plane, which is aligned perpendicular to an axial direction of planetary transmission stages 106d, 108d, 110d. Drive unit 30d is connected torsionally fixed to a part of planetary transmission stage 110d.

Figure 19:
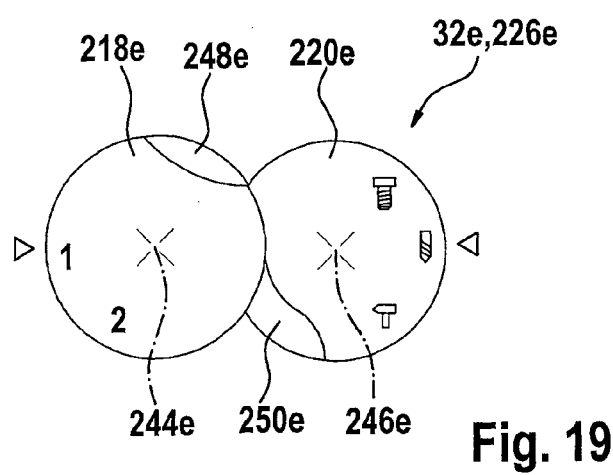
FIG. 19 shows an alternative exemplary embodiment of an operating device and a protective device of a hand-held tool device according to the present invention.

FIG. 19 shows an alternative exemplary embodiment of operating device 32e and a protective device 226e. Operating device 32e has a first operating element 218e and a second operating element 220e. Operating elements 218e, 220e are supported in a pivotable manner about rotational axes 244e, 246e. Operating elements 218e, 220e have a disk-shaped basic form. First operating element 218e, which is not shown in greater detail, is connected to a planetary transmission via a mechanism that appears meaningful to one skilled in the art. A first transmission and a second transmission are able to be set using first operating element 218e. Second operating element 220e, which is not shown in greater detail, is connected to a control element via a mechanism that appears meaningful to one skilled in the art. Using second operating element 220e, one is able to set the screw mode, the drilling mode and the percussion drilling mode. Moreover, one might be able to set a chisel mode.

Protective device 226e has a freewheeling region 248e bordered by first operating element 218e. Protective device 226e has a freewheeling region 250e bordered by second operating element 250e. Freewheeling region 248e of first operating element 218e enables the setting of the screw mode, the drilling mode and the percussion drilling operation when a second transmission has been set. Freewheeling region 250e of second operating element 220e enables the setting of the screw mode and the drilling mode when a second transmission has been set. In the percussion drilling operation, protective device 226e prevents setting the first transmission. When the first transmission has been set, protective device 226e prevents setting the percussion drilling operation.

What is claimed is:

1. A hand-held tool device, comprising:
    a striking mechanism having at least one striking mechanism shut-off clutch and a striking mechanism switching spring which opens the striking mechanism shut-off clutch in at least one operating state;
    a planetary transmission having at least one planetary transmission stage which at least partially encloses the striking mechanism switching spring in at least one plane; and
    a tool spindle including a striking surface which is oriented substantially perpendicularly relative to an axial direction of the tool spindle,
    wherein the striking mechanism is configured to transfer a rotational motion into a translatory striking motion, the striking mechanism including a striker which is configured to transfer the translatory striking motion to the striking surface of the tool spindle.

2. The hand-held tool device as recited in claim 1, wherein the planetary transmission stage is functionally situated between at least two additional planetary transmission stages of the planetary transmission.

3. The hand-held tool device as recited in claim 2, wherein the planetary transmission stage supports the striking mechanism switching spring.

4. The hand-held tool device as recited in claim 3, wherein the planetary transmission stage has a planet carrier which supports the striking mechanism switching spring.

5. The hand-held tool device as recited in claim 3, wherein the tool spindle, in at least one operating state, is connected torsionally fixed to at least one part of the planetary transmission stage.

6. The hand-held tool device as recited in claim 1, further comprising:
a drive unit which is connected torsionally fixed to a part of the planetary transmission stage.

7. The hand-held tool device as recited in claim 6, wherein the drive unit supports the striking mechanism switching spring.

8. The hand-held tool device as recited in claim 1, wherein the planetary transmission has at least two planetary transmission stages which at least partially enclose the striking mechanism switching spring in at least one plane.

9. The hand-held tool device as recited in claim 1, further comprising:
wherein the tool spindle, in at least one operating state, transfers an axial clutching force in the direction of the striking mechanism switching spring which opens the striking mechanism shut-off clutch in at least one operating state.

10. The hand-held tool device as recited in claim 1, wherein the at least one striking mechanism shut-off clutch is partially developed as one piece with the planetary transmission.

11. The hand-held tool device as recited in claim 1, wherein the at least one striking mechanism shut-off clutch is situated between a first planetary transmission stage and a second planetary transmission stage of the at least one planetary transmission.

12. The hand-held tool device as recited in claim 11, wherein the at least one striking mechanism shut-off clutch includes a first clutch which is connected torsionally fixed to a planet carrier of the first planetary transmission stage, and a second clutch which is connected torsionally fixed to a planet carrier of the second planetary transmission stage.

13. The hand-held tool device as recited in claim 11, wherein the striking mechanism switching spring is situated coaxially to the at least one planetary transmission stage.

14. The hand-held tool device as recited in claim 1, wherein the planetary transmission has at least two planetary transmission stages and the at least two planetary transmission stages each enclose the striking mechanism switching spring in at least one plane.

15. The hand-held tool device as recited in claim 1, wherein the tool spindle is supported axially displaceable for transfer of a clutching motion of the at least one striking mechanism shut-off clutch.

* * * * *